United States Patent
Radcliffe et al.

(10) Patent No.: US 6,367,805 B1
(45) Date of Patent: Apr. 9, 2002

(54) STRIPPING ARRANGEMENT

(75) Inventors: Christopher D. Radcliffe, Leeds; Jonathan G. White, Oxenhope, both of (GB)

(73) Assignee: Hoerbiger Ventilwerke GmbH, Vienna (AT)

( * ) Notice: Subject to any disclaimer, the term of this patent is extended or adjusted under 35 U.S.C. 154(b) by 0 days.

(21) Appl. No.: 09/583,732

(22) Filed: May 31, 2000

(30) Foreign Application Priority Data

Jun. 16, 1999 (AT) .............................................. 1060/99

(51) Int. Cl.⁷ ................................................ F16J 15/56
(52) U.S. Cl. ....................... 277/343; 277/344; 277/447; 277/448; 277/493
(58) Field of Search ................................ 277/343, 344, 277/435, 447, 448, 493, 550

(56) References Cited

U.S. PATENT DOCUMENTS

| | | | | |
|---|---|---|---|---|
| 1,828,178 A | * | 10/1931 | Fox | |
| 1,837,115 A | * | 12/1931 | Cook | |
| 2,966,376 A | * | 12/1960 | Reynolds | |
| 3,527,507 A | * | 9/1970 | Clark et al. | |
| 3,544,118 A | * | 12/1970 | Klein | |
| 3,612,538 A | * | 10/1971 | Sievenpiper | |
| 4,039,197 A | * | 8/1977 | Schmidt et al. | |
| 4,360,085 A | * | 11/1982 | Pendergast | |
| 4,428,584 A | * | 1/1984 | Shapiro | |
| 4,571,011 A | * | 2/1986 | Muto et al. | |

* cited by examiner

*Primary Examiner*—Anthony Knight
*Assistant Examiner*—John L. Beres
(74) *Attorney, Agent, or Firm*—Dykema Gossett PLLC

(57) ABSTRACT

In a stripping arrangement for preventing liquid from penetrating at the peripheral gap (1) between a reciprocating component (2) and a casing opening (3) surrounding the latter, a choke ring (8) is provided on the side facing the inlet of the liquid to be stripped in the stripping bushing (4) in addition to at least one stripping ring (5) arranged in a stripping bushing (4), wherein this choke ring is designed with a smooth annular surface (9) on its front side facing the inlet of the liquid, and adheres to the smooth inner front surface (10) of the stripping bushing (4) facing it, exposed to the adhesive forces (S1) in the liquid. In this way, a significant path of entry for the liquid to be stripped into the stripping bushing (4) is blocked, so that the stripping ring (5) has to strip substantially less liquid from the reciprocating component (2).

14 Claims, 1 Drawing Sheet

STRIPPING ARRANGEMENT

BACKGROUND OF THE INVENTION

1. Field of the Invention

The invention relates to a stripping arrangement for preventing liquid from penetrating at the peripheral gap between a reciprocating component and a casing opening surrounding the latter, in particular an oil scraper packing for the piston rod of a piston compressor, with a stripping bushing formed around the component in the area of the casing opening for holding at least one stripping ring, which exhibits a drain for removing the stripped liquid.

2. The Prior Art

To prevent working, coolant or lubricant fluids from penetrating at the seal in reciprocating, sealed components, e.g., the mentioned piston rod of a piston compressor, steaming machines, hydraulic pumps or presses or the like, packings with special stripping rings are most often used today in addition to other seals to strip the liquid from the moved component and return or separately remove it. To always be able to remain in stripping contact with the surface of the moved component, these stripping rings must have some clearance in the stripping bushing in the direction of movement of the component, so that they can follow the surface of the component to be stripped, and hence, for example, varying heat expansions cannot impede the relative motion of the stripping rings one to another or to the stripping bushing as the result of jamming, which would lead to larger leaks and the undesired penetration of liquid to be stripped.

In previously known arrangements of the mentioned type, especially on the inlet side of the stripping bushing facing the area with the liquid to be stripped, this always results in a relatively large amount of liquid entering in a radial direction between the first stripping ring and the inside of the stripping bushing. Difficulties are often encountered in removing this liquid as fast as possible from the packing area lying to be back due to lines that are most often small in design, and therefore become clogged easily. As a result, the most often present additional stripping rings or similar elements have major problems with the liquid that then not only adheres to the reciprocating component, but is present in the entire packing area.

The object of this invention is to improve an arrangement of the kind mentioned at the outset in such a way as to avoid the mentioned disadvantages to known arrangements like these, and to prevent excessive liquid entry in the stripping bushing, in particular in a structurally simple manner.

SUMMARY OF THE INVENTION

This object is achieved according to the present invention in a stripping arrangement of the kind mentioned above by providing a choke ring in the stripping bushing on the side facing the inlet of the liquid to be stripped, which has a smooth annular surface on its front side facing the inlet of the liquid, and adheres to the smooth inner front surface of the stripping bushing facing it during operation, due to the adhesive forces in the liquid.

This limits the possible entry of liquid into the stripping bushing to the remaining annular gap between the moved component and choke ring. This annular gap can on the one hand normally be clearly smaller, and hence designed less problematically in terms of its impact on possible liquid entry than the gap which is necessary for the movement of the stripping rings, as mentioned, and is always present on the inlet side in an axial direction, at least during the "inward" movement of the component to be stripped in conventional arrangements such as these. On the other hand, this annular gap is far less critical, since the amount of liquid still passing through it essentially adheres to the reciprocating component anyway, and is therefore stripped away by the downstream stripping ring and then removed as described. Hence, of the two remaining paths on the inlet side of the stripping bushing for the liquid to be stripped from the reciprocating component, the more critical path that allows larger amounts of liquid through between the front side of the first ring of the packing and the inner front side of the stripping bushing stays easily and reliably blocked.

The necessary snug fit of the choke ring to the accompanying inner front side of the stripping bushing during the "outward" movement of the reciprocating component (out of the stripping bushing) is ensured by the reciprocating component or the stripping rings arranged on it anyway. In the other direction, the adhesive force in the liquid in the gap between the inner front side of the stripping bushing and accompanying front surface of the choke ring must be large enough to ensure that this inlet path is not opened for the liquid to be stripped for the short duration of this movement.

In a preferred further development of the invention, the choke ring is divided, preferably diagonally divided in two, and is held together after built in by a spring-loaded element mounted on its outside periphery. Its internal diameter is slightly larger than the outside diameter of the reciprocating component. This permits an easy assembly of the choke ring, wherein the mentioned diameter ratios ensure that the reciprocating component can practically freely move through the choke ring. In particular, the liquid to be removed is not stripped from the reciprocating component. As described above, this is accomplished by the downstream stripping rings.

At this point, it must be noted that the reciprocating component can also exhibit a design that deviates from the pure circular cylindrical shape that is largely common in such drive rods and the like. In particular, sliding rods or the like designed with an oval or other cross section can naturally be equipped with the described stripping arrangement, provided only the "stripping rings" or "choke rings" exhibit an appropriately adjusted internal contour.

In an especially preferred further development of the invention, the choke ring is made out of plastic, preferably fiber-reinforced plastic, such as PTFE (polytetrafluoroethylene) reinforced with glass fiber or carbon fiber. These types of rings are easy to manufacture, and chemically very stable, which makes them suitable for most applications in question.

In another preferred embodiment of the invention, the annular surface between the front surfaces of the stripping bushing and choke ring is considerably, advantageously about ten times, larger than the front-side contacting surface of the stripping ring(s). In this way, the large application surface enables a good sealing of this possible entry way for the liquid to be stripped into the stripping bushing on the one hand, and the adhesive force in the liquid on the other side, namely between the choke ring and downstream stripping ring, also remains significantly smaller than the adhesive force essential to the invention between the choke ring and accompanying front side of the stripping bushing. As a result, the choke ring remains fixed relative to the stripping bushing during the inwardly directed stroke of the component to be stripped, while the downstream stripping ring can move along with the component to a slight extent using the axial clearance in the stripping bushing.

In another preferred embodiment of the invention, the or each stripping ring arranged on the side of the choke ring in the stripping bushing facing away from the entry of the liquid to be stripped is divided, preferably diagonally divided in two, held together after built in by a spring-loaded element mounted on its outside periphery, and consists of a metal material, preferably bronze for bearings and bushes. As a result, the stripping effect of this stripping ring downstream from the choke ring in the direction of the inlet for the liquid to be stripped can be improved or simplified in terms of installation. The bronze for bearings and bushes enables close mounting on the reciprocating component, without excessively high friction and the problems associated therewith.

Particularly advantageous in the above connection is a further development of the invention, in which the radial thickness of the stripping ring is as small as possible taking into account strength and manufacturing requirements, preferably about 4 mm. As a result, the stripping ring can still adapt well to the surface of the reciprocating component, which is especially advantageous when this component exhibits deviations from the ideal, e.g., circular cylindrical shape or already has the corresponding worn areas. This small radial thickness also makes it possible to keep the force of the spring-loaded element mounted on the outside periphery at a relatively low level. In turn, this reduces the friction losses addressed above and associated areas that have become heated, expanded and the like.

In another especially preferred embodiment of the invention, the side of the stripping ring facing the inlet of the liquid to be stripped exhibits a stripping edge that is in contact with the reciprocating component when built in, and proceeding from that a slight conical area on the inside periphery that opens toward the other side. On the one hand, the closest possible, snug fit of the stripping ring is concentrated on a stripping edge that loops in relatively easily as a result. On the other hand, this enables the return of liquid (liquid film) that still manages to penetrate under the stripping edge during stripping due to surface roughness of the reciprocating component. As a result, the liquid is not stripped on the opposing other side of the stripping ring, and hence transported in an undesired manner to remain permanently behind the stripping arrangement.

In another preferred embodiment of the invention, the choke ring and stripping ring exhibit essentially radially aligned draining grooves on their front side facing away from the inlet of the liquid to be stripped. As a result, the stripped liquid can flow away between these elements largely unimpeded without having to provide separate spacing elements or the like.

In another preferred embodiment of the invention, at least one gas seal ring set and/or another choke ring that interacts with the inner front surface of the stripping bushing facing away from the inlet of the liquid to be stripped can be arranged in the stripping bushing, on the side of the stripping ring(s) facing away from the choke ring. This results in another improvement of the stripping effect also on the external side of the stripping bushing relative to the inlet of the liquid to be stripped.

In the following, the invention will be described in even greater detail based upon the embodiments schematically depicted in the drawings.

DETAILED DESCRIPTION OF THE PREFERRED EMBODIMENTS

Figure 1:
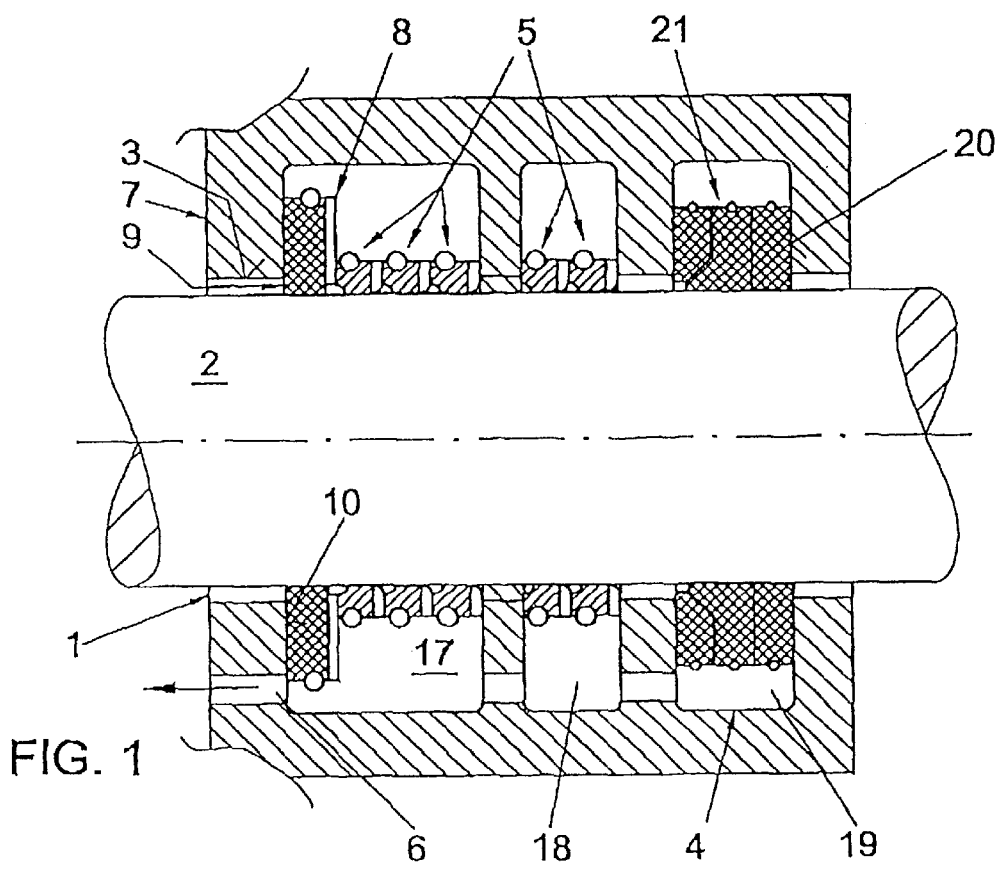
FIG. 1 shows a schematic cross section through a stripping arrangement according to the invention.
Figure 2:
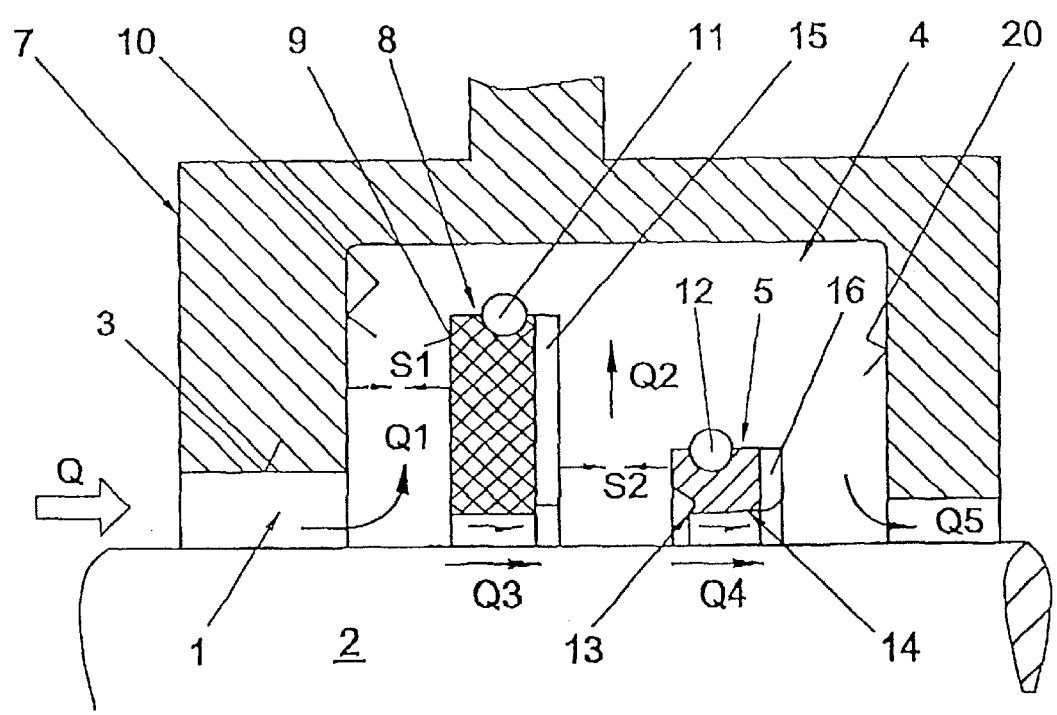
FIG. 2 shows another schematic representation of the basic structure of the arrangement according to the invention.

The stripping arrangement shown in FIGS. 1 and 2 for preventing liquid from penetrating at the peripheral gap 1 between a reciprocating component 2 and a casing opening 3 surrounding the latter includes a stripping bushing 4 formed around the component 2 in the area of the casing opening 3 for holding at least one stripping ring 5, wherein the liquid stripped away from the reciprocating component 2 is removed or returned to a corresponding circulation via a drain 6 (shown only in FIG. 1). A choke ring 8 is provided in the stripping bushing 4 on the side 7 facing the inlet of the liquid to be stripped, which has a smooth annular surface 9 on its front side facing the inlet of the liquid, and adheres to the smooth inner front surface 10 of the stripping bushing 4 facing it, exposed to the adhesive forces in the liquid. This arrangement of the choke ring 8 significantly limits the entry of liquid to be stripped from component 2 into the stripping bushing 4, as will be explained in even greater detail below based on the basic drawing in FIG. 2.

FIG. 2 shows a basic embodiment of the stripping arrangement wherein only a single choke ring 8 along with stripping ring 5 in the stripping bushing 4 is shown. The distances or gaps between the individual components have been enlarged to the extreme to illustrate the potential liquid pathways.

The amount of liquid that gets to the peripheral gap 1 or casing opening 3 from the side 7 is denoted with a Q. The partial flow that gets into the stripping bushing 4 is comprised of partial quantities Q1 between the annular surface of the first ring on the inlet side, here choke ring 8, and the inner front surface 10 of the stripping bushing 4, as well as the partial quantity Q3 between the inner periphery of the first ring (here choke ring 8) and the surface of the component 2 to be stripped itself. Q2 denotes the liquid quantity stripped from the surface of the reciprocating component 2 on the stripping ring 5, which most often simply exits the stripping bushing 4 again via the drain (6 in FIG. 1) under exposure to the force of gravity. Q4 denotes the liquid quantity that still bypasses the stripping ring 5 and adheres to the surface of the component 2 to be stripped (primarily due to its surface roughness). Finally, Q5 denotes the fraction of liquid that is still transported behind the stripping bushing 4, despite all stripping measures.

Since the stripping ring 5 (or stripping rings 5 given a multiple arrangement, e.g., according to FIG. 1) must be freely moveable on the lateral annular surfaces within certain limits, and in particular must not become jammed so that it can follow the component 2 to be stripped or any irregularities in its surface, clearance must be provided for the stripping ring 5 in an axial direction. In previously known stripping arrangements without a choke ring 8 on the inlet side, this has the direct effect of opening a relatively large gap on the inlet side to the inner front surface 10 of the stripping bushing 4 during each inward stroke of component 2 (to the right in the representation per FIGS. 1 and 2), so that a relatively large partial quantity Q1 can get into the stripping bushing 4. To prevent this partial quantity Q1 during the inwardly directed stroke of component 2, the choke ring 8 is provided, whose annular surface 9 adheres to the inner front surface 10 of the stripping bushing 4, exposed to the adhesive forces in the liquid (symbolized by S1). The annular surface between the front surfaces 9 and 10 of the stripping bushing 4 and choke ring 8 is preferably significantly larger than the contact surface of the stripping ring 5 with the choke ring 8 on the front side, so that the adhesive force S2 that also arises there remains smaller than S1.

During the inwardly directed stroke of the component 2, the choke ring 8 will therefore remain in sealing contact with the inner front surface 10 (at least over the limited time of exposure to the adhesive force, before the liquid fills the gap while exposed to the partial vacuum that arises in the gap in the process). By contrast, the stripping ring 5 can move in an axial direction up to the back inner front surface 20 of the stripping bushing 4. During the outwardly directed stroke of the component 2 (movement to the left in FIGS. 1 and 2), the choke ring 8 is pressed against the inner front surface 10 by the component 2 itself or the stripping ring 5 that moves along to the left again in the depiction. In both cases, the path for the partial quantity Q1 is therefore practically closed, so that the liquid to be stripped can practically only enter the stripping bushing 4 via the partial flow Q3 on the inner periphery of the choke ring 8.

The choke ring 8 is preferably diagonally divided in two, and is held together after built in by a spring-loaded element 11 mounted on its outside periphery. Its internal diameter is slightly larger than the outside diameter of the reciprocating component 2. This is because the choke ring 8 is intended to adhere as snugly as possible to the inner front surface 10 during operation, and could not be allowed to freely follow the surface of the reciprocating component 2 with its inner periphery. As a result, the stripping function ascribed to the stripping rings 5 described as relatively freely moveable in the stripping bushing was not an objective for the choke ring 8 from the very outset. Therefore, the choke ring 8 consisting of fiber-reinforced plastic, for example, essentially only acts to reliably seal the inlet side against the otherwise possible partial liquid flow Q1. The actual stripping of liquid from the reciprocating component 2 takes place via the stripping ring 5 specially designed for that purpose.

The stripping ring 5 is again divided diagonally in two, for example, held together after built in by a spring-loaded element 12 mounted on its outside periphery, and consists of a metal material, such as bronze for bearings and bushes. So that the surface of the reciprocating component 2 can be followed as well as possible, the radial thickness of the stripping ring 5 is as small as possible taking into account strength and manufacturing requirements, so that the actual stripping edge 13 can adapt as well as possible to the component 2. Proceeding from the stripping edge 13 lying in contact with the reciprocating component 2 with the stripping ring 5 built in, a slight conical area 14 open to the other side is provided on the inner periphery of the stripping ring 5, whose conical angle is very small, measuring about 2, for example. As a result, at least a large portion of the partial flow Q4 that still gets behind the stripping ring 5 despite or under the stripping edge 13 and adheres to the surface of the component 2 can get back in front of the stripping ring 5 or its stripping edge 13 with said component 2, even during outwardly directed return motion (to the left in FIGS. 1 and 2). If this were not provided for and the stripping ring 5 were to be equipped with a sharp stripping edge on the right side in FIG. 2 as well, for example, the collecting liquid quantity Q4 would actually be transported behind the stripping arrangement in an undesired manner.

Choke ring 8 and stripping ring 5 each exhibit essentially radially directed draining grooves 15, 16 on their front side facing away from the inlet of the liquid to be stripped, which allow the stripped liquid to flow away toward the drain 6.

In FIG. 1, the stripping bushing 4 is divided into three parts. The choke ring 18 along with three individual stripping rings 5 is situated in the first input area 17. Two additional stripping rings 5 are provided in the central area 18. In the area farthest to the right 19 in the drawing, there is a gas seal ring set, which is normally referred to as an "SLP ring" (side-loaded pressure ring). Normally provided in reverse with the first two rings, this ring set is usually used as a gas seal, but here supports the stripping effect of the overall arrangement. Other than that, however, an additional choke ring that interacts with the inner front surface 20 of the stripping bushing 4 facing away from the inlet of the liquid to be stripped could be provided as the last item on the side of the stripping ring 5 facing away from the choke ring 8. This choke ring would prevent or at least impede the partial flow denoted with Q5 in FIG. 2 in a manner similar to the one described in conjunction with Q1 above.

What is claimed is:

1. A combination of a stripping bushing which defines a drain opening and a front wall having a circular opening therein and an inner face which is flat; a reciprocating member which extends through said circular opening of said front wall to define an annular liquid inlet gap therebetween; and stripping apparatus for preventing liquid from passing through said stripping bushing with reciprocation of said reciprocating member, said stripping apparatus including a stripping ring located in said stripping casing and positioned around said reciprocating member for transferring liquid from said reciprocating member to said drain opening, and a disc-shaped choke ring located within said stripping casing adjacent said front wall, said choke ring defining a front annular face which is flat and extends in parallel with said inner face of said front wall and adheres to the inner face of the front wall due to adhesive forces of said liquid to reduce flow of liquid through said annular gap with reciprocating movement of said reciprocating member, said choke ring having a smaller inner diameter than said opening in said front wall of said stripping bushing.

2. The combination according to claim 1, wherein the choke ring is formed of separate pieces, and including a spring-loaded attachment element mounted around an outside periphery of said separate pieces, wherein the internal diameter of said choke ring is slightly larger than an outside diameter of the reciprocating member.

3. The combination according to claim 2, wherein said choke ring is formed of two separate pieces.

4. The combination according to claim 1, wherein the choke ring comprises plastic.

5. The combination according to claim 4, wherein said choke ring is reinforced with fibers.

6. The combination according to claim 1, wherein the front annular face of the choke ring is about ten times larger than a front-side contacting surface of the stripping ring.

7. The combination according to claim 1, wherein said stripping ring arranged on the side of the choke ring in the stripping bushing facing away from the inlet of the liquid to be stripped is formed of separate sections held together by a spring-loaded element mounted on an outside periphery thereof, and consists of a metal material for bearings and bushes.

8. The combination according to claim 7, wherein said stripping ring is formed of two sections.

9. The combination according to claim 7, wherein said metal material is bronze.

10. The combination according to claim 7, wherein a radial thickness of said stripping ring is as small as possible taking into account strength and manufacturing requirements.

11. The combination according to claim 10, wherein said radial thickness is about 4 mm.

12. The combination according to claim 9, wherein the side of said stripping ring facing the inlet of the liquid to be stripped includes a stripping edge that is in contact with the reciprocating component, and proceeding from a slight conical area on an inside periphery that opens toward the other side.

13. The combination according to claim 1, wherein the choke ring and said stripping ring include essentially radially aligned draining grooves on a side facing away from the inlet of the liquid to be stripped.

14. The combination according to claim 1, wherein at least one gas seal ring set or another choke ring that interacts with another inner surface of the stripping bushing facing away from the inlet of the liquid to be stripped is arranged in the stripping bushing, on the side of said stripping ring facing away from the choke ring.

* * * * *